US011165257B2

United States Patent
DeCock et al.

(10) Patent No.: US 11,165,257 B2
(45) Date of Patent: Nov. 2, 2021

(54) SYSTEM AND METHOD FOR FREQUENCY ADJUSTMENT OF PARALLEL INVERTERS COUPLED TO A GRID POWER SOURCE

(71) Applicant: Deere & Company, Moline, IL (US)

(72) Inventors: Jacob R. DeCock, Fargo, ND (US); Robert B. Shaw, Moorhead, MN (US); Tianjun Fu, West Fargo, ND (US); Long Wu, Fargo, ND (US)

(73) Assignee: Deere & Company, Moline, IL (US)

( * ) Notice: Subject to any disclaimer, the term of this patent is extended or adjusted under 35 U.S.C. 154(b) by 209 days.

(21) Appl. No.: 16/271,775

(22) Filed: Feb. 8, 2019

(65) Prior Publication Data

US 2020/0259337 A1    Aug. 13, 2020

(51) Int. Cl.
*H02J 3/46* (2006.01)
*H02M 7/493* (2007.01)
*G05B 17/02* (2006.01)

(52) U.S. Cl.
CPC ............ *H02J 3/46* (2013.01); *G05B 17/02* (2013.01); *H02M 7/493* (2013.01)

(58) Field of Classification Search
CPC ........ H02J 3/38; H02J 3/40–50; G05B 17/00; G05B 17/02; H02M 7/00; H02M 7/42; H02M 7/44; H02M 7/48; H02M 7/483; H02M 7/493; H02M 7/53; H02M 7/537; H02M 7/5381; H02M 7/5387; H02M 7/53871; H02M 7/53873; H02M 7/539; H02M 7/5395; H02M 1/00; H02M 1/08; H02M 1/081; H02M 1/082; H02M 1/12; H02M 1/14; H02M 1/15; H02M 2007/2195; H02M 2007/4822; H02M 1/0025;

(Continued)

(56) References Cited

U.S. PATENT DOCUMENTS

2016/0308459 A1 * 10/2016 Fujii ................. H02M 1/12

FOREIGN PATENT DOCUMENTS

CN       106849721 A    *   6/2017
CN       208094207 U        11/2018
WO   WO-2017045702 A1  *   3/2017  ............ H02M 7/493

OTHER PUBLICATIONS

English translation of CN106849721 A. (Year: 2017).*
Kakosimos et al., Predictive Control of a Grid-Tied Cascaded Full-Bridge NPC Inverter for Reducing High-Frequency Common-Mode Voltage Components, IEEE Transactions on Industrial Informatics, Nov. 2017, pp. 1-9, DOI: 10.1109/TII.2017.2768585, [online], [retrieved on Nov. 22, 2019]. Retrieved from the Internet: <URL: https://www.researchgate.net/publication/320782692>.

(Continued)

*Primary Examiner* — Thienvu V Tran
*Assistant Examiner* — Carlos O Rivera-Perez

(57) ABSTRACT

A first inverter has a set of first output phases coupled to a grid voltage source. A second inverter has a set of second output phases coupled to the grid voltage source. A phase measurement device is adapted to measure at least one reference phase of the grid voltage source at a reference phase point. An electronic data processor is configured to: determine an observed phase difference between the reference phase point and an observed position sample of a pulse-width-modulation carrier signal of the first inverter, the second inverter, or each parallel-coupled inverter; determine a target phase difference between the reference phase point and target position sample of the pulse-width-modulation carrier signal; determine a frequency adjustment to the pulse-width-modulation carrier signal of the first inverter, the second inverter, or all parallel-coupled inverters, based on a difference between the observed phase difference and the target phase difference.

20 Claims, 8 Drawing Sheets

(58) Field of Classification Search
CPC ............. H02M 1/0067; H02M 1/0043; H02M 7/2195; H02M 7/4822; H03L 7/06–235
USPC ......... 363/15–17, 40–43, 65, 71, 72, 95–99, 363/123, 131–134; 323/212–219, 266, 323/268, 271–275, 282–286, 351; 307/43, 82
See application file for complete search history.

(56) References Cited

OTHER PUBLICATIONS

Naderi et al., Phase-Shifted Carrier PWM Technique for General Cascaded Inverters, IEEE Transactions on Power Electronics, May 2008, pp. 1257-1269, vol. 23, No. 3.

Sinha et al., An inclusive review on different multi-level inverter topologies, their modulation and control strategies for a grid connected photo-voltaic system, Solar Energy, Aug. 2018, pp. 633-657, DOI: 10.1016/j.solener.2018.06.001, [online], [retrieved on Nov. 22, 2019]. Retrieved from the Internet: <URL: https://doi.org/10.1016/j.solener.2018.06.001>.

European Search Report issued in counterpart application No. 20152950.0 dated Jun. 10, 2020 (07 pages).

\* cited by examiner

SYSTEM AND METHOD FOR FREQUENCY ADJUSTMENT OF PARALLEL INVERTERS COUPLED TO A GRID POWER SOURCE

DISCLOSURE

This disclosure relates to a system and method for a frequency or phase adjustment of parallel inverters coupled to a grid power source.

BACKGROUND

In certain prior art, two or more inverters are coupled to an alternating current grid power source by using a phase offset or interleaving angle between the inverters. However, variations in the phase of the grid power source tends to increase harmonic content and current ripple (e.g., in the aggregate alternating current output phase signals) even if the inverters operate with precise and stable phase outputs. Thus, there is need to compensate or adjust the carrier frequency of the pulse-width-modulation signal of one or more inverters to reduce or ameliorate harmonic content and phase ripple associated with the junction of the inverters to the alternating current grid power source.

SUMMARY

In accordance with one embodiment, a system and method for operating a set of inverters in parallel with an output coupled to a grid power source (e.g., a grid voltage source) comprises a first inverter and a second inverter. A first inverter has a set of first output phases coupled to a grid voltage source. A second inverter has a set of second output phases coupled to the grid voltage source. A phase measurement device is adapted to measure at least one reference phase of the grid voltage source at a reference phase point. An electronic data processor is configured to determine an observed phase difference between the reference phase point and an observed position sample of one of a pulse-width-modulation carrier signal of the first inverter, the second inverter, or each parallel-coupled inverter. The electronic data processor is configured to determine a target phase difference between the reference phase point and target position sample of one of the pulse-width-modulation carrier signal. The electronic data processor is configured to determine a frequency adjustment to the pulse-width-modulation carrier signal of the first inverter, the second inverter, or all parallel-coupled inverters based on a difference between the observed phase difference and the target phase difference.

BRIEF DESCRIPTION OF THE DRAWINGS

Like reference numbers in any set of two or more drawings indicate like elements, features, processes, or steps.

DETAILED DESCRIPTION

In one embodiment, the method and system for path planning a path of a vehicle relates to a computer-implemented method and system in which one or more data processors process, store, retrieve, and otherwise manipulate data in communication with one or more data storage devices and networks, as described in this document and the accompanying drawings. As used in this document, "configured to, adapted to, or arranged to" mean that any data processor is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any drawing in this document. Alternately, separately from or cumulatively with the above definition, "configured to, adapted to, or arranged to" means that any vehicle electronics or any data processing system comprises one or more components described herein as software modules, equivalent electronic hardware modules, or both to execute any referenced functions, mathematical operations, calculations, determinations, processes, methods, algorithms, subroutine.

In any of the above referenced drawings of this document, any arrow or line that connects any blocks, components, modules, memory, data storage, data processors, electronic components, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

Figure 1:
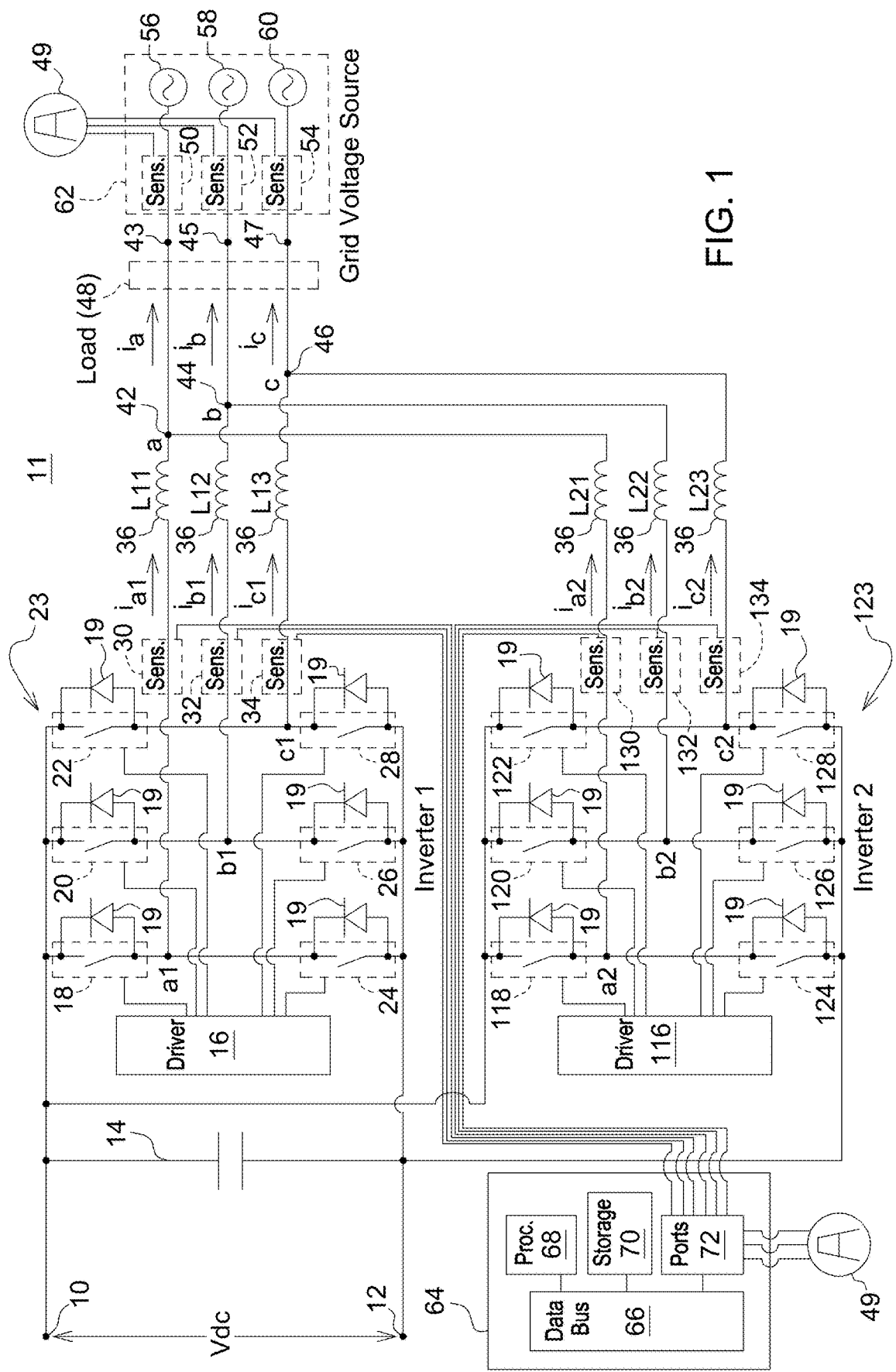
FIG. 1 is a schematic diagram of one embodiment of inverters coupled to a grid voltage source.

In the system 11 of FIG. 1, a first input of first inverter 23 and a second input 123 of a second inverter are coupled in parallel to a direct current voltage source via direct current terminals (10, 12). At the input of the inverters is a capacitor 14 coupled between the direct current terminals (10, 12). Although one capacitor 14 is shared in parallel between two inverters, in alternate configurations each inverter may include a separate capacitor such that the separate capacitors of the inverters are connected in parallel to one another.

As illustrated in FIG. 1, each inverter (23, 123) has three phases with three corresponding phase output terminals. In the first inverter 23, the phase output terminals are labeled a1, b1 and c1 for the first phase or phase "a", the second phase or phase "b", and the third phase or phase "c", respectively. Similarly, for the second inverter 123, the phase output terminals are labeled a2, b2 and c2 for the first phase or phase "a", the second phase or phase "b", and the third phase or phase "c", respectively.

Each phase of the first inverter 23 has a low-side switch (24, 26, 28) and a high-side switch (18, 20, 22) coupled in series between direct current terminals (10, 12). In one embodiment, in the first inverter 23, the first phase comprises the low-side switch 24 and high-side switch 18 with switched terminals coupled in series between the direct current terminals (10, 12); the second phase comprises the low-side switch 26 and high-side switch 20 with switched terminals coupled in series between the direct current terminals (10, 12); the third phase comprises the low-side switch 28 and high-side switch 22 with switched terminals coupled in series between the direct current terminals (10, 12).

Similarly, each phase of the second inverter 123 has a low-side switch (124, 126, 128) and a high-side switch (118, 120, 122) coupled in series between direct current terminals (10, 12). In one embodiment, in the second inverter 123, the first phase comprises the low-side switch 124 and high-side switch 118 with switched terminals coupled in series between the direct current terminals (10, 12); the second phase comprises the low-side switch 126 and high-side switch 120 with switched terminals coupled in series between the direct current terminals (10, 12); the third phase comprises the low-side switch 128 and high-side switch 122 with switched terminals coupled in series between the direct current terminals (10, 12).

Each switch (24, 26, 28, 124, 126, 128, 18, 20, 22, 118, 120, 122) has switched terminals that are switched to an active state (on state or high logic level) or inactive state (off state or low logic level) in response to a control signal applied to a control terminal of the switch via one or more driver modules (16, 116). In one embodiment, each driver module (16, 116) provides a pulse-width modulated (PWM) signal, a square wave, or another control signal for modulating or controlling the switches of the inverters (23, 123). Further, in one configuration one or more driver modules (16, 116) provide a precise phase-aligned, phase-coordinated, phase-locked or phase-synchronized control signals (e.g., PWM signals) with one or more fixed target phase offset(s) for modulating or controlling the switches of the parallel-coupled inverters (e.g., 23, 123), where the control signals are derived from one or more PWM carrier signals. Although the switches (24, 26, 28, 124, 126, 128, 18, 20, 22, 118, 120, 122) are shown as electrical switches, each switch may comprise a transistor, such as a field effect transistor or an insulated gate bipolar junction transistor. The diodes 19 connected across the switched terminals of each switch switches (24, 26, 28, 124, 126, 128, 18, 20, 22, 118, 120, 122) may protect the switch that comprises a transistor from damage from switching transients, for example.

As shown in FIG. 1, three output phases of the first inverter 23 and are coupled in parallel to three corresponding output phases of the second inverter 123 via resistive loads, inductive loads, or inductors 36 in series with each common output phase terminal (42, 44, 46). In one embodiment, the inductive loads or the inductors 36 at the output phase terminals are equalized with a target tolerance of each other such that no phase delay lines, inductance, reactance, capacitance, transformers, or filters are required to compensate for any material differences between the phase outputs. The aggregate or common output phase terminals (42, 44, 46) are coupled to corresponding phase terminals of the grid voltage source 62. As illustrated in FIG. 1, an optional load 48 may be present between the common output phase terminals (42, 44, 46) of the parallel-coupled inverters (23, 123) and the corresponding grid phase terminals (43, 45, 47) of the grid voltage source 62, where the dashed lines indicate that the optional load 48 may be omitted in alternate configurations. For instance, the optional load 48 may comprise an alternating current electric machine, a motor, transmission lines, or another electrical load. In the example of FIG. 1, the grid voltage source or grid supply comprises a multi-phase output signal having a phase "a," signal (56), a phase "b" signal (58), and phase "c" signal (60).

The aggregate phase output at the junction of the inverter common output phase terminals (42, 44, 46) and the grid phase terminals (43, 45, 47) is associated with current ripple and harmonic content that can be reduced or ameliorated by the system and method for frequency adjustment of the parallel inverters. As illustrated in FIG. 1, $i_{a1}$ and $i_{a2}$ are the inverter phase output currents of phase "a", and $i_a$ is the sum of $i_{a1}$ and $i_{a2}$ of the parallel inverters for a given phase. The ripple frequency of $i_a$ is two times that of $i_{a1}$ and $i_{a2}$; the ripple amplitude of $i_a$ is reduced by maintain a phase offset in one of PWM carriers by 180 degrees. The grid voltage source 62 has a reference current for phase "a" that is $i_a$, although one or more phases of the grid voltage source 62 can be used as reference phases.

One or more driver modules (16, 116) provides control signals for the switches of the first inverter 23 and the second inverter 123. A data processing system 64 is configured to control the driver module (16, 116). The data processing system 64 comprises a data processor 68, a data storage device 70, and data ports 72 that are coupled to a data bus 66. The first data processor 68, the first data storage device 70, and the data ports 72 can communicate with each other via the data bus 66.

The data processor 68 may comprise one or more of the following: an electronic data processor 68, a microprocessor, a microcontroller, an application specific integrated circuit (ASIC), digital signal processor (DSP), a programmable logic device, an arithmetic logic unit, or another electronic data processing device. The data storage device 70 may comprise electronic memory, registers, shift registers, volatile electronic memory, a magnetic storage device, an optical storage device, or any other device for storing data.

Sensors (30, 32, 34, 130, 132, 134), such as current sensors or voltage sensors, may be associated with one or more phase outputs of each inverter. As illustrated, for each inverter, a first phase or phase "a" has a first sensor (30, 130); a second phase or phase "b" has a second sensor (32, 132); a third phase or phase "c" has a third sensor (34. 134).

Further, reference sensors (50, 52, 54), such as current sensors or voltage sensors, may be associated with one or more reference phases of the grid voltage source 62. In one embodiment, a reference sensor 50 is configured to measure the reference voltage, such as $V_{an}$ or the first phase or phase "a" of the grid voltage source 62. However, in other embodiments, reference sensors (50, 52, 54), such as voltage sensors or current sensors, may be used for each phase of the grid voltage source 62. As illustrated in FIG. 1, the grid voltage source 62 has a first reference sensor 50 for a first phase or phase "a", a second reference sensor 52 for a second phase or phase "b", and a third reference 54 sensor for the third phase or phase "c", where the phases are associated with the grid reference source of grid voltage source 62. In FIG. 1, the reference sensors (50, 52, 54) are coupled to the data ports 72 of the data processing system 64 via transmission lines 49 (e.g., wires, cables, fiber optics, or the like), where the symbol A indicates that the transmission lines 49 are continuous, or interconnected via one or more connectors.

If current sensors are used, the current sensors may be coupled to a first electromagnetic field associated with a phase output terminal of the first inverter 23, a second electromagnetic field associated with a phase output terminal of the second inverter 123, or all parallel-coupled inverters to the grid. The sensors may be associated with an analog-to-digital converter to convert analog current or voltage measurements to digital signals for input to the data port 72. Further, an optional input interface to the analog-to-digital converter comprises a scaling interface or signal compressor to compress or place the measured signals within a range that can be processed by the analog-to-digital converter, whereas the output of the analog-to-digital converter may be coupled to a buffer memory, a flip-flip or a data-holding circuit for input to the data port 72 of the data processing system 64.

In accordance with one embodiment, a system and method for operating a set of inverters in parallel with an output coupled to a grid power source (e.g., a grid voltage source 62) comprises a first inverter 23 and a second inverter 123. In alternate configurations, multiple inverters may be coupled in parallel to each other.

A first inverter 23 has a set of first output phases coupled to a grid voltage source 62. A second inverter 123 has a set of second output phases coupled to the grid voltage source 62 in parallel to the corresponding first output phases, such as phase "a", phase "b" and phase "c" for a three phase inverters and grid voltage sources 62. A phase measurement device is adapted to measure at least one reference phase of the grid voltage source 62 at a reference phase point. An electronic data processor 68 is configured (e.g., programmed with software instructions) to determine an observed phase difference between the reference phase point and an observed position sample of one of a pulse-width-modulation carrier signal of the first inverter 23, the second inverter 123, or each parallel-coupled inverter. The electronic data processor 68 is configured (e.g., programmed with software instructions) to determine a target phase difference between the reference phase point and target position sample of one of the pulse-width-modulation carrier signal. The electronic data processor 68 is configured (e.g., programmed with software instructions) to determine a frequency adjustment to the pulse-width-modulation carrier signal of the first inverter 23, the second inverter 123, all parallel-coupled inverters based on a difference between the observed phase difference and the target phase difference.

The electronic data processor 68 may apply various techniques to determine the frequency adjustment, where the techniques may be applied separately or cumulatively. Under a first technique, if the target phase difference is greater than the observed phase difference, the frequency adjustment increases by a first adjustment ratio multiplier the pulse-width-modulation frequency of the first inverter 23 and the second inverter 123. For example, if the target phase difference is greater than the observed phase difference, the frequency adjustment comprises a first frequency adjustment multiplier ratio ($f_{PWM\_Adjust1}$) that increases the pulse-width-modulation frequency of the first inverter 23 and the second inverter 123 in accordance with the following equation:

$$f_{PWM\_Adjust1} = \frac{f_{PWM}}{1 - \frac{\delta_1}{360}},$$

where $\delta_1 = 360 + (\Delta P - \Delta P_{desired})$, where $f_{PWM}$ is the observed frequency of the carrier of the pulse width modulation of the first inverter 23, the second inverter 123, or all parallel-coupled inverters (e.g., both the first inverter 23 and the second inverter 123), where $\Delta P$ observed phase difference, $\Delta P_{desired}$ is the target phase difference, and $\delta_1$ is the first composite phase difference.

Under a second technique, if the target phase difference is less than or equal to the observed phase difference, the frequency adjustment increases by a second adjustment ratio multiplier the pulse-width-modulation frequency of the first inverter 23 and the second inverter 123. For example, if the target phase difference is less than or equal to the phase difference, the frequency adjustment comprises a second frequency adjustment multiplier ratio ($f_{PWM\_Adjust2}$) that increases the pulse-width-modulation frequency of the first inverter 23 and the second inverter 123 in accordance with the following equation:

$$f_{PWM\_Adjust2} = \frac{f_{PWM}}{1 - \frac{\delta_2}{360}},$$

where $\delta_2 = \Delta P - \Delta P_{desired}$, where $f_{PWM\_Adjust2}$ is the observed frequency of the carrier of the pulse width modulation of the first inverter 23, the second inverter 123, or all parallel-coupled inverter (e.g., both the first inverter 23 and the second inverter 123), where $\Delta P$ observed phase difference, $\Delta P_{desired}$ is the target phase difference and $\delta_2$ is the second composite phase difference.

Under a third technique, if the target phase difference is greater than the observed phase difference, the frequency adjustment decreases by a primary adjustment ratio multiplier the pulse-width-modulation frequency of the first inverter 23 and the second inverter 123. For example, if the target phase difference is greater than the observed phase difference, the frequency adjustment comprises a primary frequency adjustment multiplier ratio ($f_{PWM\_Adjust1'}$) that decreases the pulse-width-modulation frequency of the first inverter 23 and the second inverter 123 in accordance with the following equation:

$$f_{PWM\_Adjust1'} = \frac{f_{PWM}}{2 - \frac{\delta_1}{360}},$$

where $\delta_1 = 360 + (\Delta P - \Delta P_{desired})$, where $f_{PWM}$ is the observed frequency of the carrier of the pulse width modulation of the first inverter 23, the second inverter 123, or all parallel-coupled inverters (e.g., or both the first inverter 23 and the second inverter 123) where $\Delta P$ observed phase difference, $\Delta P_{desired}$ is the target phase difference, and $\delta_1$ is the first composite phase difference.

Under a fourth technique, if the target phase difference is less than or equal to the observed phase difference, the frequency adjustment decreases by a secondary adjustment ratio multiplier the pulse-width-modulation frequency of the first inverter 23 and the second inverter 123. For example, if the target phase difference is less than or equal to the phase difference, the frequency adjustment comprises a second frequency adjustment multiplier ratio ($f_{PWM\_Adjust2'}$) that decreases the pulse-width-modulation frequency of the first inverter 23 and the second inverter 123 in accordance with the following equation:

$$f_{PWM\_Adjust2'} = \frac{f_{PWM}}{2 - \frac{\delta_2}{360}},$$

where $\delta_2 = \Delta P - \Delta P_{desired}$, where $f_{PWM}$ is the observed frequency of the carrier of the pulse width modulation of the first inverter 23, the second inverter 123, or all parallel-coupled inverters (e.g., or both the first inverter 23 and the second inverter 123), where $\Delta P$ observed phase difference, $\Delta P_{desired}$ is the target phase difference, and $\delta_2$ is the second composite phase difference.

Under a fifth technique, during measurement samples of one phase of the grid voltage source 62 prior to the measurement samples reaching reference point, the data processor 68 is configured to maintain a nominal frequency of the pulse-width-modulation carrier of the first inverter 23 and the second inverter 123, or each parallel-coupled inverter.

Under a sixth technique, in a first sampling interval between a first position sample (e.g., associated with the observed phase position) and a second position sample (e.g., associated with or following a desired position sample) of the PWM carrier phase position signal after reaching a reference phase point of the reference grid carrier signal, the data processing system 64 or data processor 68 maintains (e.g., in a first cycle of the PWM carrier signal) the initial, original or nominal frequency, or its corresponding period T1, of the carrier PWM signal of the parallel-coupled inverters, such as the first inverter 23 and the second inverter 123. For example, the reference phase point of one phase of the grid voltage source 62 at a reference phase point is set to one-hundred and eighty degrees or any other fixed reference phase point, between zero and three-hundred and sixty degrees, on the reference carrier phase signal of the grid voltage source 62.

Under a seventh technique, in a second sampling interval between a second position sample and a third position sample of the PWM carrier phase position signal after reaching a reference phase point of the reference grid carrier signal, the data processing system 64 or data processor 68 adjusts, increases, or decreases the nominal, initial or original PWM carrier signal to an adjusted PWM carrier frequency, or its corresponding period T2 of the carrier PWM signal of the parallel-coupled inverters, such as the first inverter 23 and the second inverter 123, or each parallel-coupled inverter. For example, the reference phase point of one phase of the grid voltage source 62 at a reference phase point is set to one-hundred and eighty degrees or another fixed reference phase point, between zero degrees and three-hundred and sixty degrees, on the reference carrier phase signal of the grid voltage source 62.

Under an eighth technique, during taking measurement samples of one phase of the grid voltage source 62 after the measurement samples reach a reference point and prior to reaching a next cycle of one phase of the grid voltage source 62, the data processor 68 is configured to adjust the carrier frequency of the pulse-width-modulation signal of the first inverter 23 and the second inverter 123, or each parallel-coupled inverter, where the carrier frequency of the pulse-width-modulation signal is adjusted for a duration (e.g., minimum duration) of a period associated with a single adjusted cycle of the adjusted carrier frequency. Accordingly, from time to time, the duration of the frequency adjustment tends vary with any frequency adjustment (e.g. increase or decrease) to the adjusted carrier frequency that is required to track the reference carrier signal of the grid voltage source 62.

Under a ninth technique, during taking measurement samples of one phase of the grid voltage source 62 upon reaching the next cycle returning to the nominal frequency of the pulse width modulation for the next cycle of the one phase of the grid voltage source 62. In one example, during taking measurement samples of one phase of the grid voltage source 62: upon reaching the next reference cycle of the grid voltage source 62 (which could represent multiple inverter cycles of the pulse-width-modulation carrier signal of any parallel-coupled inverter), the data processor 68 is configured to return to a nominal frequency of the pulse width modulation for the next reference cycle of the one phase of the grid voltage source 62. In another example, during taking measurement samples of one phase of the grid voltage source 62 upon reaching a next inverter cycle (of the pulse-width-modulation carrier signal of any parallel connected inverter) after the single adjusted inverter cycle (after the minimum duration) of the adjusted carrier frequency, the data processor 68 is configured to return to a nominal frequency of the pulse width modulation for the next inverter cycle (of each parallel-coupled inverter).

Under a tenth technique, the data processor 68 arranged to set or establish an upper frequency limit or a lower frequency limit for the frequency adjustment. The data processing system 64 may further comprise a user interface for accepting user-definable upper frequency limit or a user-definable lower frequency limit. The user interface comprises a display, touch screen display, a keypad, keyboard, a switch, a pointing device (e.g., electronic mouse), or other device for supporting input and output of data from the data processing system 64. The user interface may be coupled to the data port 72, for example.

Under an eleventh technique, the upper frequency limit and the lower frequency limit associated with a maximum adjustment ratio multiplier and a minimum adjustment ratio multiplier, respectively. For example, the user may define the phase difference as $\delta_1 = 360 + (\Delta P - \Delta P_{desired})$, $\delta_2 = \Delta P - \Delta P_{desired}$ or another suitable phase difference via the input of software instructions or parameters to the data processor 68, where the selected user-defined phase difference establishes: (1) the upper frequency limit and its corresponding maximum adjustment ratio multiplier and (2) the lower frequency limit and its corresponding minimum adjustment ratio.

Figure 2:
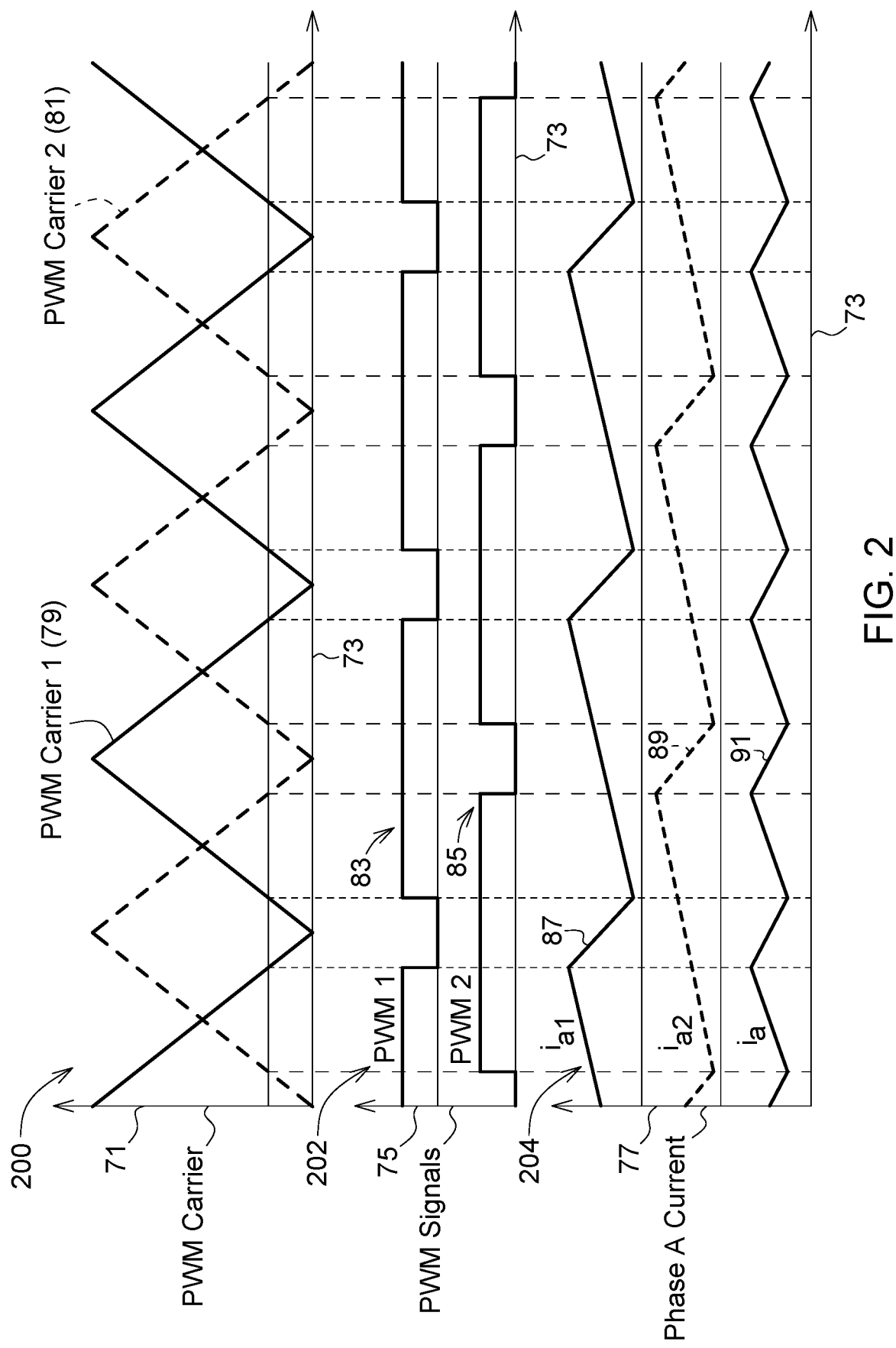
FIG. 2 shows a set of graphical representations of signal amplitude versus common time scale including the following: an upper graph comprising first pulse-width-modulation carrier signal superimposed on a second pulse-width-modulation carrier signal of a first inverter and the second inverter, respectively; a middle graph comprising first pulse-width-modulation signal aligned with a second pulse-width-modulation signal along the common time scale for the first inverter and the second inverter, respectively; and a lower graph comprising phase "a" current output of the first inverter aligned with the corresponding phase "a" current output of the second inverter coupled in parallel to yield the aggregate phase "a" current.

FIG. 2 shows a set of graphical representations of signal amplitude versus common time scale. Each vertical axis (71, 75, 77) of FIG. 2 represents amplitude or magnitude of a signal, whereas each horizontal axis 73 represents time.

First, an upper graph 200 comprises first pulse-width-modulation carrier signal 79 superimposed on a second pulse-width-modulation carrier signal 81 of a first inverter 23 and the second inverter 123, respectively. The first pulse-width-modulation carrier signal 79 is generally one-hundred and eighty degrees offset (e.g., fixed phase offset that varies based on the number of parallel-coupled inverters) in phase from the second pulse width modulation carrier signal 81, consistent with two inverters (23, 123) coupled in parallel. Further, the relationship of the one-hundred and eighty-degree (180) phase offset may be maintained even if the data processor 68 adjusts the carrier frequency of the first pulse-width-modulation signal 79 and/or carrier frequency of the second pulse-width-modulation signal 81 to align with the reference signal (e.g., $V_{an}$) provided by the grid voltage source 62. In general, the fixed phase offset of the output phases of the phase each parallel-coupled inverter is three-hundred and sixty degrees divided by the number (N) of parallel-coupled inverters or 360/N, which equals 180 degrees for two inverters in parallel. Accordingly, if the number of inverters in parallel is increased, the phase offset is determined by the equation 360/N, where N is the number of inverters in parallel.

Second, a middle graph 202 comprises a first pulse-width-modulation signal 83 aligned with a second pulse-width-modulation signal 85 along the common time scale of the horizontal axis 73 for the first inverter 23 and the second inverter 123, respectively. In the middle graph 202, the top waveform comprises a first PWM signal 83, such as a square wave, a composite sine wave or other signal output at a phase output terminal of the first inverter 23; the bottom waveform comprises a second PWM signal 85, such as a square wave, a composite sine wave, or other signal output at the phase output terminal of the second inverter 123, where the first PWM signal 83 and the second PWM signal 85 of the middle graph 202 result from, or are derived from, the respective pulse-width-modulation carrier signals of the upper graph 200.

The pulse-width-modulation signals (83, 85) can appear as simple or complex square waves at a phase output terminal (e.g., phase "a" output terminal 36) of the first inverter 23 and the corresponding or like phase output terminal (e.g., phase "a" output terminal 36) of the second inverter 123. Further, the first inverter 23 or the second inverter 123 is capable of producing a phase output with square wave that mimics or is representative of a sine or cosine function.

Third, the lower graph 204 comprises phase "a" current output (a1) of the first inverter 23 aligned with the corresponding phase "a" current output (a2) of the second inverter 123 coupled in parallel to yield the aggregate phase "a" current ($i_a$). In the lower graph 204, the top waveform 87 comprises a phase "a" output phase (ia1) of the first inverter 23; the middle waveform 89 (illustrated in dashed lines) comprises a phase "a" output phase (ia2) of the second inverter 123; the bottom waveform 91 comprises an aggregate waveform of the phase "a" output phases (ia) of the first inverter 23 and the second inverter 123.

Figure 3:
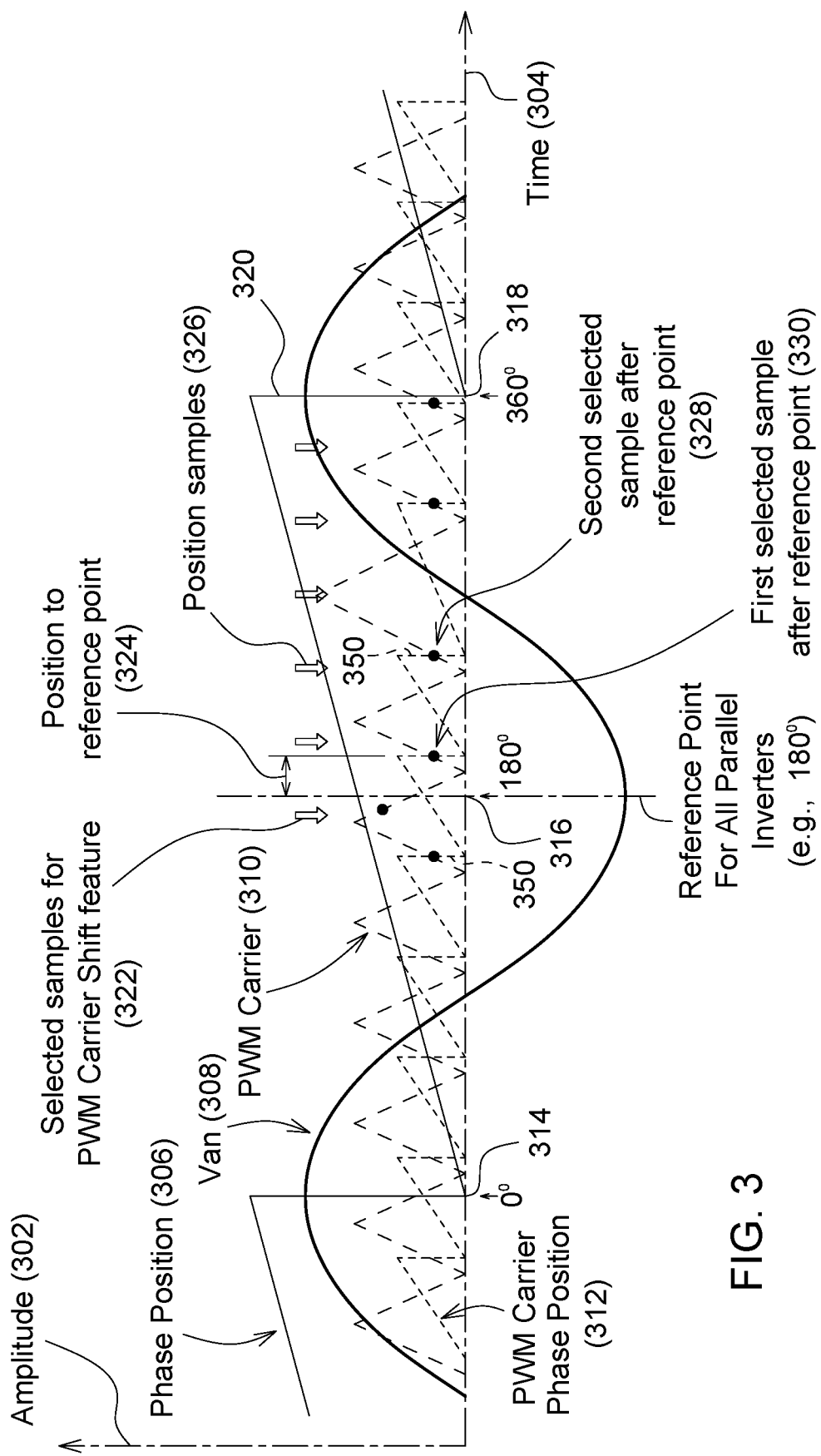
FIG. 3 shows a graphical representation of signal amplitude versus time for the following superimposed signals: a reference carrier signal associated with one phase of the grid voltage source, a reference phase position signal associated with sample measurement times for the one phase of the grid voltage source; a pulse-width-modulation carrier for one phase of an inverter, and a corresponding pulse-width-modulation carrier phase position signal for the one phase of the inverter.

In FIG. 3, the vertical axis represents the amplitude 302 or magnitude of the signal, whereas the horizontal axis represents time 304. FIG. 3 shows a graphical representation of signal amplitude versus time for the following superimposed signals: a reference carrier signal 308 (e.g., $V_{an}$) associated with one phase of the grid voltage source 62, a reference carrier phase position signal 306 for the one phase of the grid voltage source 62; a pulse-width-modulation (PWM) carrier signal 310 for one phase of an inverter (23, 123), and a corresponding pulse-width-modulation (PWM) carrier phase position signal (312) for the one phase of the inverter (23, 123).

In one embodiment, the reference carrier signal 308 comprises $V_{an}$, which is the phase "a" line-to-neutral voltage of the grid voltage source 62. The reference phase position or reference phase point 316 is the phase angular position of the reference carrier signal 308, such as $V_{an}$. The reference phase point 316 refers to a selected reference phase angle of the $V_{an}$ of the grid voltage source 62, which depends on the number of inverters. For example, the reference phase point 316 can be fixed or set at one-hundred and eighty (180) degrees of the reference carrier signal 308, such as $V_{an}$. More generally, the reference phase position 316 can be set to any phase between zero and three-hundred and sixty degrees.

The data processor 68 or data processing system 64 determines the observed phase difference (labeled position to reference point 324) between the reference point 316 and an observed position sample 330 (e.g., first selected sample after reference point 316) of the PWM carrier signal 310 of any parallel-coupled inverter, such as the first inverter 23, the second inverter 123, or each parallel-coupled inverter. Note that the sampling time or interval for each observed position sample coincides with a corresponding decreasing edge or transition 350 in the PWM carrier phase position signal 312, which represents the phase transition 350 from three hundred and sixty degrees phase position (e.g., corresponding to peak amplitude of PWM phase position 312) to zero degrees phase position (e.g., corresponding to zero amplitude of PWM phase position 312) of the PWM carrier signal 310. Although not illustrated in FIG. 3, the interval between samples (330, 328) can be reduced by taking additional samples during one PWM carrier cycle or PWM carrier phase position cycle. For example, if the data processor 68 samples the PWM carrier phase position signal (e.g., 312) twice in any one PWM cycle, this position sampling method is called as double control method.

The data processor 68 or data processing system 64 determines the target phase difference between the reference point and a target position sample (or desired position sample in FIG. 4) of the PWM carrier signal of any parallel-coupled inverter, such as the first inverter 23, the second inverter 123, or each parallel-coupled inverter.

In one embodiment, the frequency adjustment of the PWM carrier signal of one or more inverters (e.g., all inverters) will only be adjusted (e.g., reset) once every fundamental period of a reference carrier signal 308 associated with one phase of the grid voltage source 62, such as $V_{an}$ fundamental period (1/Fundamental frequency). A reference phase point 316 of the reference carrier phase position signal 306 for the one phase of the grid voltage source 62, such as the A phase angle of $V_{an}$ is selected as the reference phase point 316 for frequency adjustment; hence, PWM carrier phase adjustment. In FIG. 3 in one illustrative embodiment, the reference phase point 316 is set at 180 degrees as the reference point for PWM carrier phase shifting. As illustrated in FIG. 3, the reference carrier phase position signal 306 starts at zero degrees phase position 314 with a corresponding minimum amplitude of the reference carrier phase position signal 306; the carrier phase position signal ends at three-hundred and sixty degrees phase position 318 at a corresponding maximum amplitude of the reference carrier phase position signal 306; the transition 320 comprises an trailing edge between the previous three-hundred and sixty degrees phase position 318 and the next zero degrees phase position 314.

Because one period of the PWM carrier signal 310 corresponds to one PWM period, only one sample in one PWM period is required for selection for the data processor 68 to evaluate or determine the frequency adjustment based on the reference phase point 316, observed phase different and target phase difference (which may be referred to as the reference position cross check process). However, if the sampling rate or sampling interval is set for the double control rate, two samples 322 are available for one PWM period for evaluation or for the reference position cross check process.

In FIG. 3, the first selected sample 330 means the first sample in the PWM counting-up mode when the observed phase position (associated with the observed phase difference) is greater than the reference phase position 316. The data processing system 64 or the data processor 68 calculates the frequency adjustment of the PWM carrier or its new PWM frequency based on the desired or target PWM carrier phase shift (angle) and sets the PWM carrier frequency to the new value at this sampling time or interval. In FIG. 3, the new PWM frequency or PWM carrier frequency adjustment is made during the next PWM carrier cycle (of the PWM carrier signal 310) after the observed phase position, where the sampling time (e.g., at time t) of the observed phase position coincides with the zero-degree PWM carrier phase position (e.g., waveform transition 350). As illustrated in FIG. 3, the data processor 68 or data processing system 64 reduces the PWM carrier frequency (e.g., of the triangular pulse with the higher peak amplitude than the amplitudes of the surrounding triangular pulses in the pulse train or waveform and with the longer triangular pulse duration or period) for the next PWM carrier cycle that occurs during the next sampling time (e.g., at time t+1) or at the second selected sample.

In FIG. 3, the second selected sample 328 means the second sample in the PWM counting-up mode when the observed phase position (associated with the observed phase difference) is greater than the reference phase position 316. The data processing system 64 or the data processor 68 determines a second or next PWM frequency adjustment to set or revert back to the original value (nominal frequency) prior to the above first or initial PWM frequency adjustment. It is possible to make one PWM frequency adjustment per each fundamental period of the reference signal (e.g. $V_{an}$) for fine phase adjustments (e.g., in real time with precise shorter duration), or multiple PWM frequency adjustments per each fundamental period of the reference signal (e.g. $V_{an}$) for coarse phase adjustments (e.g., in real time with a longer duration than the shorter duration), where reverting back to the original PWM carrier frequency may be designated, by convention, as a separate second PWM frequency adjustment or an integral portion of the first PWM frequency adjustment. Several frequency adjustment techniques may be used separately or cumulatively.

Under a first technique, the data processing system 64 or the data processor 68 will wait for the PWM carrier signal to complete one full cycle at the adjusted PWM carrier frequency, prior to reverting back to the original value (nominal frequency) of the PWM carrier frequency, which is consistent with the waveforms illustrated in FIG. 3.

Under a second technique, the data processing system 64 or the data processor 68 will wait for the PWM carrier signal to complete one full cycle for one fundamental period associated with the grid reference carrier signal 308 until another reference phase point is crossed, prior to reverting back to the original value (nominal frequency) of the PWM carrier frequency.

Under a third technique, the reference phase position of the $V_{an}$ for PWM carrier phase shifting can be selected at any phase position from 0 to 360 degrees.

In FIG. 3, the data processing system 64 or data processor 68 adjusts the phase shift for interleaved PWM modulation by adjusting the PWM frequency. There is a relationship between frequency adjustment of the pulse-width-modulation carrier frequency and phase shifting between two or more pulse-width-modulation carrier signals 310 of any phase. If the pulse-width-modulation (PWM) carrier frequency of one or more inverters of a set are adjusted dynamically in real time (e.g., for the duration of a cycle period of the adjusted PWM carrier prior to reverting back to the nominal PWM carrier frequency), the relative phase (or phase shift) between the inverters in the set can be adjusted or shifted, particularly as the transition is made between an initial or nominal PWM carrier frequency and an adjusted PWM carrier frequency. However, if the nominal PWM carrier frequency, or the adjusted PWM carrier frequency is maintained and stable, the preexisting or subsisting phase offset generally remains constant between the PWM carrier frequencies of the inverters. Accordingly, the data processing system 64 or data processors 68 for inverters in parallel can adjust the PWM carrier frequency (e.g., of all parallel inverters) for one or more cycles to provide a precisely timed phase shift (e.g., only for the duration of a cycle period of the adjusted PWM carrier prior to reverting back to the nominal PWM frequency) relative to the grid reference phase or grid reference phases, while maintaining a constant or fixed target phase offset (e.g., one hundred and eighty degrees for two parallel inverters) of the PWM carrier frequencies between or among parallel inverters to reduce current ripple and harmonic content in the output phases that are coupled to grid voltage source 62. The data processing system 64 or data processor 68 can provide or command a precisely timed frequency adjustment; hence, precisely timed phase shift can be coordinated to track dynamically in real-time the observed grid reference phase or reference phases in a successive manner, where different frequency adjustments (e.g., along with corresponding phase shifts and corresponding cycle durations) can be selected for successive sampling periods or sample intervals. The PWM carrier cycle duration may be less than or equal to an integer multiple of N sampling periods, where N is any positive integer equal to or greater than one.

Figure 4:
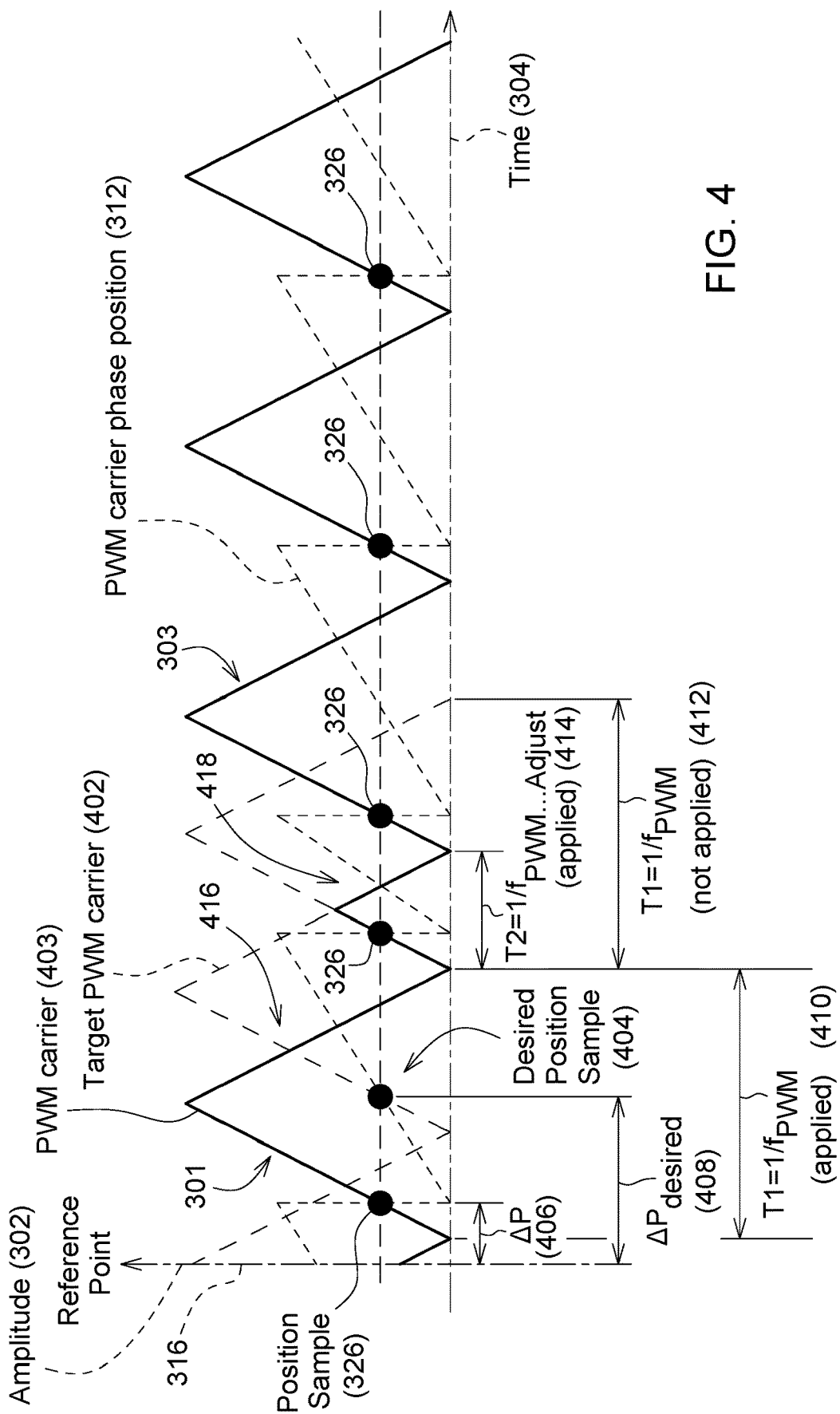
FIG. 4 shows one illustrative graphical representation of signal amplitude versus time for the following superimposed signals: an observed pulse-width-modulation carrier signal that is offset in phase from a (co-frequency) target pulse-width-modulation carrier signal of an inverter; and a corresponding phase position signal for sample measurement times.

In FIG. 4, the vertical axis represents the amplitude 302 or magnitude of the signal, whereas the horizontal axis represents time 304. FIG. 4 shows one illustrative graphical representation of signal amplitude 302 versus time 304 for the following superimposed signals: a pulse-width modulation carrier signal 403 (e.g., actual or observed pulse-width-modulation carrier signal) that is offset in phase from a (co-frequency) target pulse-width-modulation carrier signal 402 of an inverter (23, 123); and a corresponding phase position signal 312 for sample measurement times. FIG. 4 shows a frequency adjustment 418 that is an increased frequency of the pulse-width-modulation carrier, where the second triangular peak of the pulse-width-modulation carrier 403 is closely spaced in time 304 (along the horizontal axis) with respect to the other triangular peaks indicating a higher frequency of the frequency adjustment 418.

As illustrated in FIG. 4, $\Delta P_{desired}$ 408 means the target phase difference between the reference phase point 316 on the reference grid carrier signal (e.g., 180 degrees phase of the $V_{an}$ signal) and a target position sample 404 (or desired position sample), where the target position sample 404 lies on or intercepts: (a) a target PWM carrier 402, which is a model, hypothetical grid-phase-aligned PWM carrier signal (e.g., for the next fundamental carrier cycle) and which is illustrated in dashed lines, and (b) the PWM carrier phase position signal 312. $\Delta P$ 406 is the observed phase difference between the reference phase point 316 and an observed position sample 326, where, in FIG. 4, the observed position sample is taken at a sampling time or sampling point that coincides with or intercepts the zero-degree phase (or transition) of the PWM carrier phase position signal 312. The difference, $\delta$, is the difference between the observed phase difference and the target phase difference, where $\delta = \Delta P - \Delta P_{desired}$.

In FIG. 4, T1 (410) is the original or initial time period of the PWM carrier 403 of a parallel-coupled inverter, such as the first inverter 23, the second inverter 123, or each parallel connected inverter. For example, the first full triangular peak 301 of the PWM carrier signal that intercepts the position sample 326 at the first sampling time has an original or initial time period of T1 (410), consistent with the initial, original or nominal PWM carrier frequency. The target PWM carrier signal 402 may operate with the original or initial time period of T1 (410, 412), consistent with the initial, original or nominal PWM carrier frequency.

T2 (414) is the new PWM time period that is associated with the adjusted frequency 418 or adjusted triangular pulse of the PWM carrier frequency. Here in FIG. 4, the period T2 (414) is less than T1 (410, 412); hence, the adjusted frequency is greater than the original or nominal PWM carrier frequency. The data processor 68 or data processing system 64 determines and applies the adjusted frequency after the first position sample 326 and the target position sample 404 (or desired position sample). As illustrated in FIG. 4, the adjusted frequency 418 is higher than the nominal or original frequency, has a duration of one cycle of the adjusted carrier PWM frequency as shown by its triangular pulse (e.g., 418), has a lesser peak amplitude or magnitude than the peak amplitude of the other triangular pulses (e.g., 301, 303) within the PWM carrier waveform 403. The illustrative duration (T2, 414) of one cycle of the adjusted carrier PWM frequency 418 (e.g., increased carrier frequency of PWM frequency) are less than or equal to a single sampling interval or sampling period of adjacent time sample points 326 that lie or intercept the PWM carrier phase position signal 312.

Figure 5:
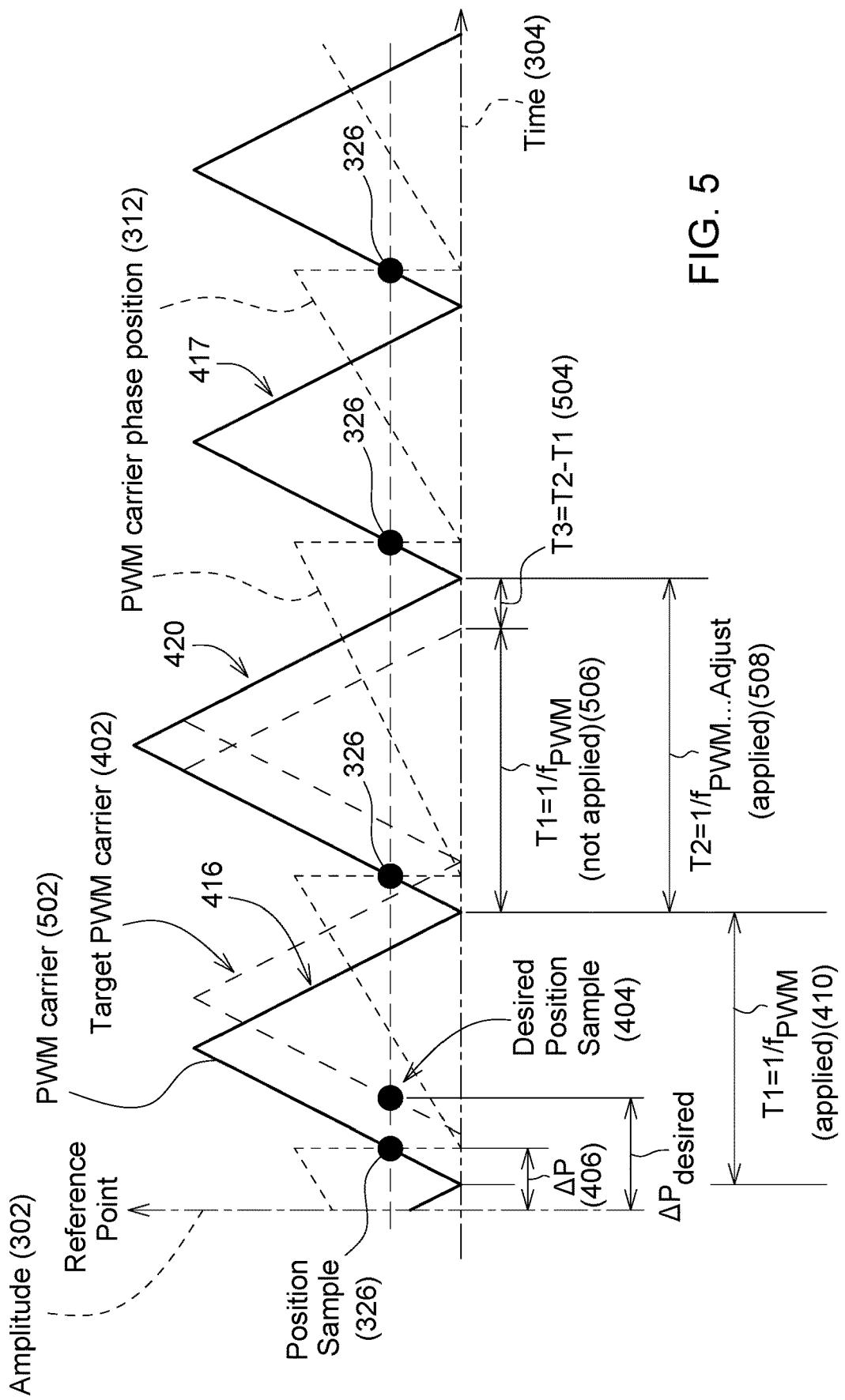
FIG. 5 shows another illustrative graphical representation of signal amplitude versus time for the following superimposed signals: an observed pulse-width-modulation carrier signal that is offset in phase from a (co-frequency) target pulse-width-modulation carrier signal of an inverter; and a corresponding phase position signal for sample measurement times.

As used in FIG. 4 and FIG. 5, $f_{PWM}$ is the original PWM carrier frequency (1/T1) and $f_{PWM\_Adjust}$ is the new or adjusted PWM frequency (1/T2). The data processing system 64 can phase shift the PWM carrier 403 to the desired time position by adjusting the PWM carrier frequency.

FIG. 5 shows another illustrative graphical representation of signal amplitude 302 versus time 304 for the following superimposed signals: a pulse-width-modulation carrier signal 502 (e.g., an actual or observed PWM carrier signal) that is offset in phase from a (co-frequency) target pulse-width-modulation carrier signal 402 (e.g., hypothetical or model, grid-aligned PWM carrier) of an inverter (23, 123); and a corresponding phase position signal 312 for sample measurement times. FIG. 5 shows a frequency adjustment 420 that is a decreased frequency of the pulse-width-modulation carrier 502, where the second triangular peak (e.g., 420) of the pulse-width-modulation carrier is further spaced in time with respect to the other triangular peaks (416, 417) indicating a lower frequency. Like reference numbers in FIG. 4 and FIG. 5 indicate like features, parameters, or elements.

T2 (508) is the new PWM time period that is associated with the adjusted frequency of the PWM carrier frequency. Here in FIG. 4, the period T2 (508) is greater than T1 (410, 506); hence, the adjusted frequency is lower than the original or nominal PWM carrier frequency of the PWM carrier signal 502. The data processor 68 or data processing system 64 determines and applies the adjusted frequency 420 of an adjusted waveform (e.g., adjusted triangular pulse) after the first position sample 326 and the target position sample 404, or desired position sample. As illustrated in FIG. 4, the adjusted frequency 420 is lower than the nominal or original frequency, has a duration of one cycle of the adjusted carrier PWM frequency 420 as shown by its triangular pulse, has a greater peak amplitude or magnitude than the peak amplitude of the other triangular pulses (416, 417) within the PWM carrier signal 502 (e.g., PWM waveform). The illustrative duration of one cycle of the adjusted carrier PWM frequency 420 (e.g., decreased carrier frequency of PWM frequency) are less than or equal to a single sampling interval or sampling period of adjacent time sample points that lie or intercept the PWM carrier phase position signal. In FIG. 5, T3 (504) is the difference between T1 and T2.

Figure 6:
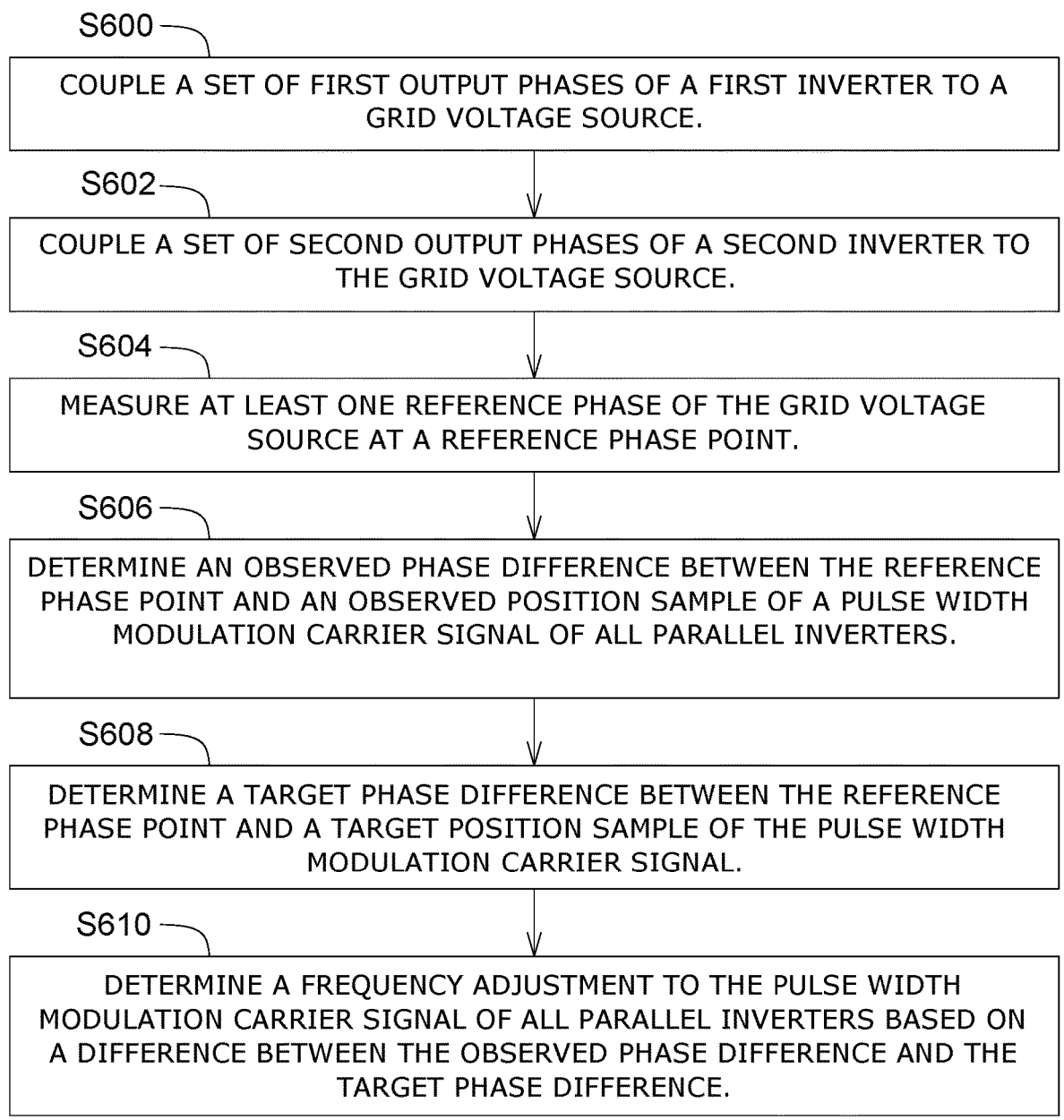
FIG. 6 is one embodiment of a flow chart for operating a set of inverters in parallel coupled to a grid power source.

FIG. 6 is one embodiment of a flow chart for operating a set of inverters in parallel coupled to a grid power source. The method of FIG. 6 begins in step S600 and steps S602, which are optional and can be performed in any order.

In step S600, a set of first output phases of a first inverter 23 are coupled to a grid voltage source 62.

In step S602, a set of second output phases of a second inverter 123 are coupled to the grid voltage source 62 in parallel with the respective first output phases (e.g., equivalent or counterpart first output phases).

In an alternate embodiment, steps S600 and S602 can be omitted or replaced by parallel-coupled inverters that are assembled, pre-configured or manufactured for connection to the grid. For example, a set of first output phases of a first inverter 23 are coupled to a set of respective second output phases of a second inverter 123 at (or to define) aggregate or common phase output terminals during assembly, pre-configuration, manufacturing or another process. In turn, the aggregate or common output terminals are coupled to the grid voltage source 62 (e.g., in the field after shipment of a multi-inverter assembly of two or more parallel-coupled inverters).

In step S604, a sensor (e.g., a current sensor or voltage sensor) measures at least one reference phase of the grid voltage source 62 at a reference phase point.

In step S606, an electronic data processor 68 or the data processing system 64 determines an observed phase difference between the reference phase point and an observed position sample of a pulse-width-modulation carrier signal of the first inverter 23, the second inverter 123, or each parallel-coupled inverter.

In step S608, the electronic data processor 68 or the data processing system 64 determines a target phase difference between the reference phase point and the target position sample of one of the pulse-width-modulation carrier signal.

In step S610, the electronic data processor 68 or the data processing system 64 determines a frequency adjustment to the pulse-width-modulation carrier signal of the first inverter 23, the second inverter 123, or all parallel-coupled inverters based on a difference (e.g., first composite phase difference or a second composite phase difference) between the observed phase difference and the target phase difference.

Step S610 may be accomplished or executed in accordance with various techniques, which may be applied separately or cumulatively.

Under a first technique, if the target phase difference is greater than the observed phase difference, the data processor 68 is configured to increase the frequency adjustment by a first adjustment ratio multiplier the pulse-width-modulation frequency of the first inverter 23 and the second inverter 123. For example, under the first technique, the following equation is applied to determine a first frequency adjustment or first frequency adjustment ratio multiplier:

$$f_{PWM\_Adjust1} = \frac{f_{PWM}}{1 - \frac{\delta_1}{360}},$$

where $\delta_1 = 360 + (\Delta P - \Delta P_{desired})$, where $f_{PWM}$ is the observed frequency of the carrier of the pulse-width-modulation of the first inverter 23, the second inverter 123, or all parallel-coupled inverters (e.g., both the first inverter 23 and the second inverter 123) where $\Delta P$ observed phase difference, $\Delta P_{desired}$ is the target phase difference, and $\delta_1$ is the first composite phase difference.

Under a second technique, if the target phase difference is less than or equal to the observed phase difference, the data processor 68 increases frequency adjustment by a second adjustment ratio multiplier the pulse-width-modulation frequency of the first inverter 23 and the second inverter 123. For example, under the second technique, the frequency adjustment comprises a second frequency adjustment multiplier ratio ($f_{PWM\_Adjust2}$) that increases the pulse-width-modulation frequency of the first inverter 23 and the second inverter 123 in accordance with the following equation:

$$f_{PWM\_Adjust2} = \frac{f_{PWM}}{1 - \frac{\delta_2}{360}},$$

where $\delta_2 = \Delta P - \Delta P_{desired}$, where $f_{PWM\_Adjust2}$ is the observed frequency of the carrier of the pulse-width-modulation of the first inverter 23, the second inverter 123, or all parallel-coupled inverter (e.g., both the first inverter 23 and the second inverter 123), where $\Delta P$ observed phase difference, $\Delta P_{desired}$ is the target phase difference, and $\delta_2$ is the second composite phase difference.

Under a third technique, if the target phase difference is greater than the observed phase difference, the data processor 68 decreases the frequency adjustment by a primary adjustment ratio multiplier the pulse-width-modulation frequency of the first inverter 23 and the second inverter 123. For example, if the target phase difference is greater than the observed phase difference, the frequency adjustment comprises a primary frequency adjustment multiplier ratio ($f_{PWM\_Adjust1'}$) that decreases the pulse-width-modulation frequency of the first inverter 23 and the second inverter 123 in accordance with the following equation:

$$f_{PWM\_Adjust1'} = \frac{f_{PWM}}{2 - \frac{\delta_1}{360}},$$

where $\delta_1 = 360 + (\Delta P - \Delta P_{desired})$, where $f_{PWM}$ is the observed frequency of the carrier of the pulse-width-modulation of the first inverter 23, the second inverter 123, or all parallel-coupled inverters (e.g., or both the first inverter 23 and the second inverter 123) where $\Delta P$ observed phase difference, $\Delta P_{desired}$ is the target phase difference, and $\delta_1$ is the first composite phase difference.

Under a fourth technique, if the target phase difference is less than or equal to the observed phase difference, the data processor 68 decreases the frequency adjustment by a secondary adjustment ratio multiplier the pulse-width-modulation frequency of the first inverter 23 and the second inverter 123. For example, if the target phase difference is less than or equal to the phase difference, the frequency adjustment comprises a second frequency adjustment multiplier ratio ($f_{PWM\_Adjust2'}$) that decreases the pulse-width-modulation frequency of the first inverter 23 and the second inverter 123 in accordance with the following equation:

$$f_{PWM\_Adjust2'} = \frac{f_{PWM}}{2 - \frac{\delta_2}{360}},$$

where $\delta_2 = \Delta P - \Delta P_{desired}$, where $f_{PWM}$ is the observed frequency of the carrier of the pulse width modulation of the first inverter 23, the second inverter 123, or all parallel-coupled inverters (e.g., or both the first inverter 23 and the second inverter 123), where $\Delta P$ observed phase difference, $\Delta P_{desired}$ is the target phase difference, and $\delta_2$ is the second composite phase difference.

Under a fifth technique, the above frequency adjustments (e.g., for any of the first through the fourth techniques, inclusive) are stored in a look-up table, chart, an inverted file or data structure as frequency adjustment ratio multipliers and corresponding phase differences between the target phase difference and the observed phase difference. For example, the data structure may store calculations or determination of frequency adjustments in accordance with the equations for different ranges of observations of, $\Delta P$, the observed phase difference; $\Delta P_{desired}$, the target phase difference; and/or $\delta_1$, the first composite phase difference; and $\delta_2$, the second composite phase difference.

Figure 7:
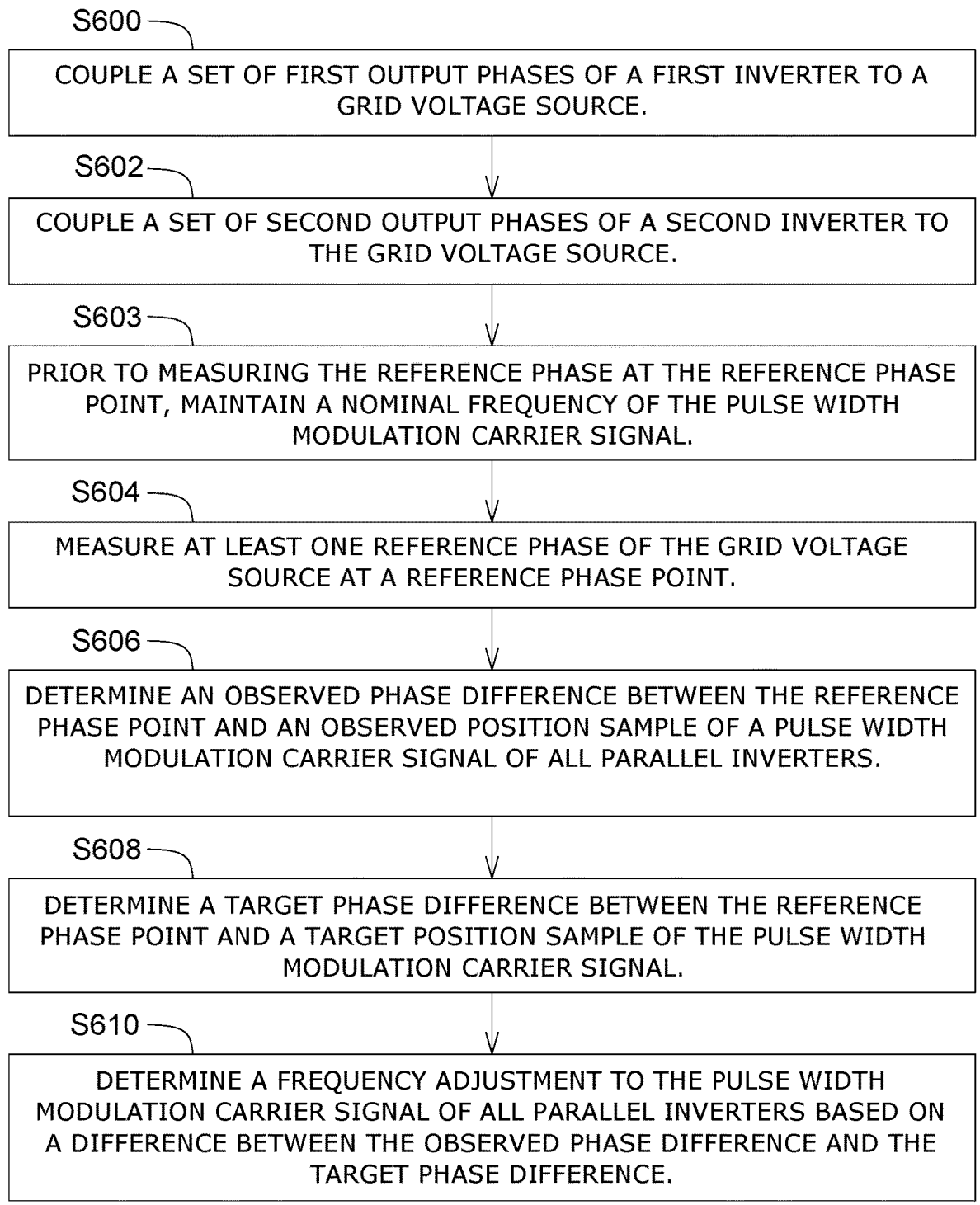
FIG. 7 is another embodiment of a flow chart for operating a set of inverters in parallel coupled to a grid power source.

Under a sixth technique, the data processor 68 is configured to determine the above frequency adjustments (for any of the first through the fourth techniques, inclusive) in accordance with a defined duration or minimum duration. For example, during taking measurement samples of one phase of the grid voltage source 62 after the measurement samples reach a reference point and prior to reaching a next cycle of one phase of the grid voltage source 62, the data processor 68 is configured to adjust the carrier frequency of the pulse-width-modulation signal of the first inverter 23 and the second inverter 123, where the carrier frequency of the pulse-width-modulation signal is adjusted for a minimum duration of a period associated with a single adjusted cycle of the adjusted carrier frequency FIG. 7 is another embodiment of a flow chart for operating a set of inverters in parallel coupled to a grid power source. The method of FIG. 7 is similar to the method of FIG. 6, except the method of FIG. 7 further comprises step S603. Like reference numbers in FIG. 6 and FIG. 7 indicate like steps, features or procedures.

In step S603, prior to measuring the reference phase at the reference phase point, the electronic data processor 68 or data processing system 64 maintains a nominal frequency of the pulse-width-modulation carrier signal. For example, during measurement samples of one phase of the grid voltage source 62 prior to the measurement samples reaching reference point, the data processor 68 is configured to maintain a nominal frequency of the pulse-width-modulation carrier of the first inverter 23 and the second inverter 123.

Figure 8:
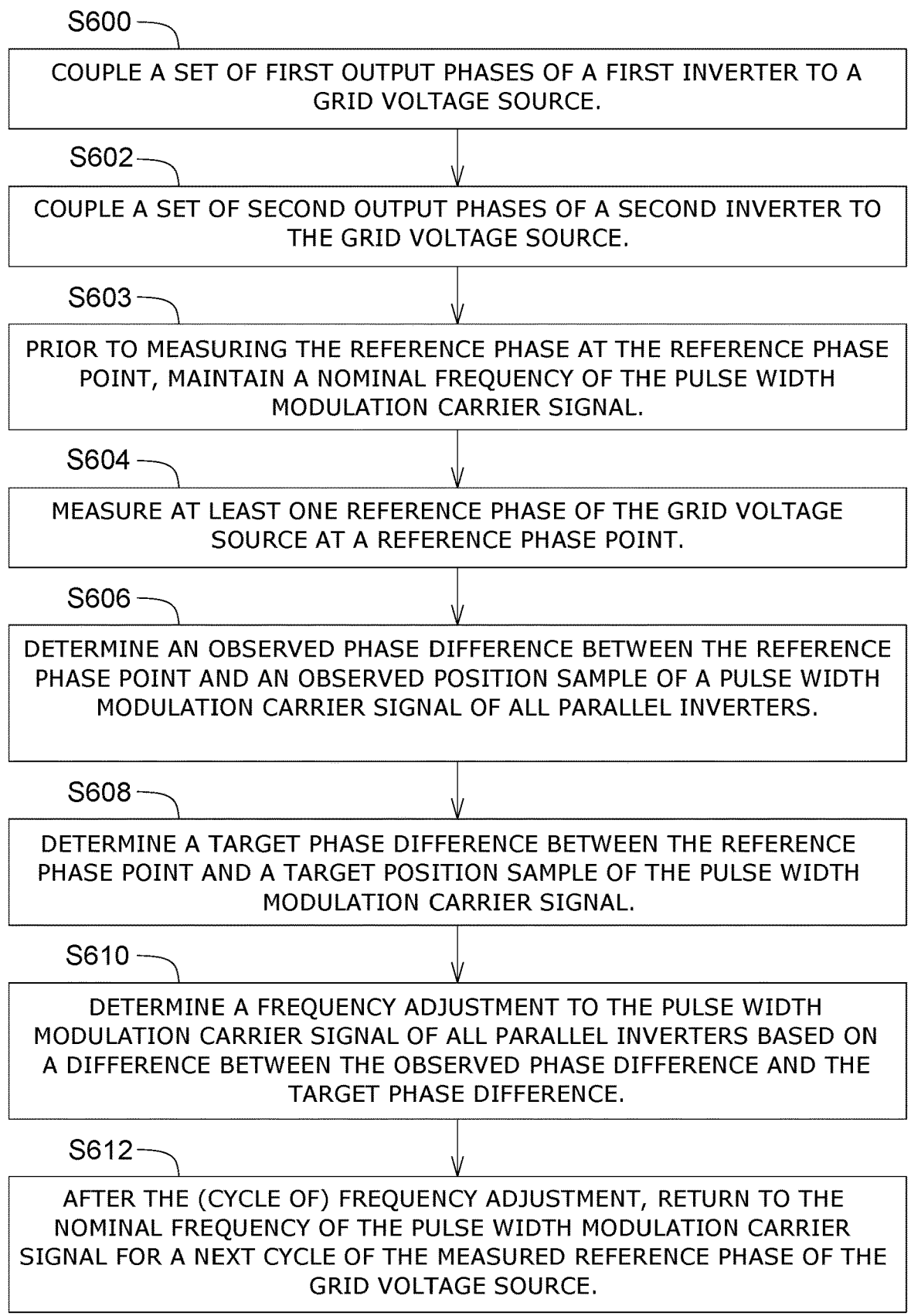
FIG. 8 is yet another embodiment of a flow chart for operating a set of inverters in parallel coupled to a grid power source.

FIG. 8 is yet another embodiment of a flow chart for operating a set of inverters in parallel coupled to a grid power source. The method of FIG. 8 is similar to the method of FIG. 6, except the method of FIG. 8 further comprises step S612. Like reference numbers in FIG. 6 and FIG. 8 indicate like steps, features or procedures.

In step S612, after the frequency adjustment, the data processor 68 or data processing system 64 returns to the nominal frequency of the pulse-width-modulation carrier signal for a next reference cycle of the measured reference phase of the grid voltage source 62 or for the next inverter cycle of the parallel-coupled inverters. In one example, during taking measurement samples of one phase of the grid voltage source 62: upon reaching the next reference cycle of the grid voltage source 62 (which could represent multiple inverter cycles of the pulse-width-modulation carrier signal of any parallel-coupled inverter), the data processor 68 is configured to return to a nominal frequency of the pulse width modulation for the next reference cycle of the one phase of the grid voltage source 62. In another example, during taking measurement samples of one phase of the grid voltage source 62 upon reaching a next inverter cycle (of the pulse-width-modulation carrier signal of any parallel connected inverter) after the single adjusted inverter cycle (after the minimum duration) of the adjusted carrier frequency, the data processor 68 is configured to return to a nominal frequency of the pulse width modulation for the next inverter cycle (of each parallel-coupled inverter).

Having described the preferred embodiment, it will become apparent that various modifications can be made without departing from the scope of the invention as defined in the accompanying claims.

The following is claimed:

1. A system for operating a set of inverters in parallel with an output coupled to a grid voltage source, the system comprising: a first inverter having a set of first output phases coupled to the grid voltage source; a second inverter having a set of second output phases coupled to the grid voltage source in parallel to the respective first output phases; a phase measurement device for measuring at least one reference phase of the grid voltage source at a reference phase point; a data processor configured to determine an observed phase difference between the reference phase point and an observed position sample of one of a pulse-width-modulation carrier signal of the first inverter, the second inverter or each parallel-coupled inverter; the data processor configured to determine a target phase difference between the reference phase point and target position sample of one of the pulse-width-modulation carrier signal; and the data processor configured to determine a frequency adjustment to the pulse-width-modulation carrier signal of the first inverter, the second inverter, or all parallel-coupled inverters based on a difference between the observed phase difference and the target phase difference, wherein if the target phase difference is greater than the observed phase difference, the frequency adjustment comprises a first frequency adjustment multiplier ratio ($f_{PWM\_Adjust1}$) that increases a pulse-width-modulation frequency of the first inverter and the second inverter, or all parallel-coupled inverters, in accordance with the following equation:

$$f_{PWM\_Adjust1} = \frac{f_{PWM}}{1 - \frac{\delta_1}{360}},$$

where $\delta_1 = 360 + (\Delta P - \Delta P_{desired})$, wherein $f_{PWM}$ is as observed frequency of the carrier of the pulse width modulation of the first inverter, the second inverter, or each parallel-coupled inverter, where $\Delta P$ is the observed phase difference and $\Delta P_{desired}$ is the target phase difference.

2. The system according to claim 1 wherein, separately or cumulatively, or for a further sampling interval, if the target phase difference is less than or equal to the observed phase difference, the frequency adjustment increases by a second adjustment ratio multiplier the pulse-width-modulation frequency of the first inverter and the second inverter, or each parallel-coupled inverter.

3. The system according to claim 1 wherein, separately or cumulatively, or for a further sampling interval, if the target phase difference is greater than the observed phase difference, the frequency adjustment decreases by a primary adjustment ratio multiplier the pulse-width-modulation frequency of the first inverter and the second inverter, or each parallel-coupled inverter.

4. The system according to claim 1 wherein separately or cumulatively, or for a further sampling interval, if the target phase difference is less than or equal to the observed phase difference, the frequency adjustment decreases by a secondary adjustment ratio multiplier the pulse-width-modulation frequency of the first inverter and the second inverter, or each parallel-coupled inverter.

5. The system according to claim 1 wherein separately or cumulatively, or for a further sampling interval, if the target phase difference is less than or equal to the observed phase difference, the frequency adjustment comprises a second frequency adjustment multiplier ratio ($f_{PWM\_Adjust2}$) that increases the pulse-width-modulation frequency of the first inverter and the second inverter, or all parallel coupled inverters, in accordance with the following equation:

$$f_{PWM\_Adjust2} = \frac{f_{PWM}}{1 - \frac{\delta_2}{360}},$$

where $\delta_2 = \Delta P - \Delta P_{desired}$, wherein $f_{PWM}$ the observed frequency of the carrier of the pulse width modulation of the first inverter, the second inverter, or each parallel-coupled inverter, where $\Delta P$ is the observed phase difference and $\Delta P_{desired}$ is the target phase difference.

6. The system according to claim 1 wherein separately or cumulatively, or for a further sampling interval, if the target phase difference is greater than the observed phase difference, the frequency adjustment comprises a primary frequency adjustment multiplier ratio ($f_{PWM\_Adjust1'}$) that decreases the pulse-width-modulation frequency of the first inverter and the second inverter, or each parallel-coupled inverter, in accordance with the following equation:

$$f_{PWM\_Adjust1'} = \frac{f_{PWM}}{2 - \frac{\delta_1}{360}},$$

where $\delta_1 = 360 + (\Delta P - \Delta P_{desired})$, where $f_{PWM}$ is the observed frequency of the carrier of the pulse width modulation of the first inverter, the second inverter, or each parallel-coupled inverter, where ΔP is the observed phase difference and ΔP$_{desired}$ is the target phase difference.

7. The system according to claim 1 wherein separately or cumulatively, or for a further sampling interval, if the target phase difference is less than or equal to the observed phase difference, the frequency adjustment comprises a second frequency adjustment multiplier ratio (f$_{PWM\_Adjust2'}$) that decreases the pulse-width-mod Li lation frequency of the first inverter and the second inverter, or all parallel-coupled inverters, in accordance with the following equation:

$$f_{PWM\_Adjust2'} = \frac{f_{PWM}}{2 - \frac{\delta_2}{360}},$$

where δ2=ΔP−ΔP$_{desired}$, where f$_{PWM}$ is the observed frequency of the carrier of the pulse width modulation of the first inverter, the second inverter, or each parallel-coupled inverter, where ΔP is the observed phase difference and ΔP$_{desired}$ is the target phase difference.

8. The system according to claim 1 wherein the reference phase point of one phase of the grid voltage source at a reference phase point is set to any fixed phase position point between zero and three-hundred and sixty degrees.

9. The system according to claim 1 wherein during measurement samples of one phase of the grid voltage source prior to the measurement samples reaching reference point, the data processor is configured to maintain a nominal frequency of the pulse-width-modulation carrier of the first inverter and the second inverter, or each of the parallel-coupled inverters.

10. The system according to claim 1 wherein during taking measurement samples of one phase of the grid voltage source after the measurement samples reach a reference point and prior to reaching a next reference cycle of one phase of the grid voltage source, the data processor is configured to adjust a carrier frequency of the pulse-width-modulation signal of the first inverter and the second inverter, where the carrier frequency of the pulse-width-modulation signal is adjusted for a minimum duration of a period associated with a single adjusted cycle of the adjusted carrier frequency.

11. The system according to claim 10 wherein during taking measurement samples of one phase of the grid voltage source upon reaching the next reference cycle of the grid voltage source or upon reaching a next inverter cycle after the single adjusted inverter cycle of the adjusted carrier frequency, the data processor is configured to return to a nominal frequency of the pulse width modulation for the next carrier cycle of the one phase of the grid voltage source, or the next inverter cycle, respectively.

12. The system according to claim 1 further comprising:
setting an upper frequency limit or a lower frequency limit for the frequency adjustment.

13. The system according to claim 12 wherein the upper frequency limit is associated with a maximum adjustment ratio multiplier and wherein the lower frequency limit is associated with a minimum adjustment ratio multiplier.

14. A method for operating a set of inverters in parallel with an output coupled to a grid voltage source, a set of first output phases of a first inverter coupled to a set of respective second output phases of a second inverter to define common phase terminals that are coupled to the grid voltage source; the method comprising: measuring at least one reference phase of the grid voltage source at a reference phase point; determining an observed phase difference between the reference phase point and an observed position sample of a pulse-width-modulation carrier signal of the first inverter, the second inverter, or each parallel-coupled inverter; determining a target phase difference between the reference phase point and the target position sample of one of the pulse-width-modulation carrier signal; and determining a frequency adjustment to the pulse-width-modulation carrier signal of the first inverter, the second inverter, or all parallel-coupled inverters based on a difference between the observed phase difference and the target phase difference, wherein if the target phase difference is greater than the observed phase difference, the frequency adjustment comprises a first frequency adjustment multiplier ratio (f$_{PWM\_Adjust1}$) that increases a pulse-width-modulation frequency of the first inverter and the second inverter, or all parallel-coupled inverters, in accordance with the following equation:

$$f_{PWM\_Adjust1} = \frac{f_{PWM}}{1 - \frac{\delta_1}{360}},$$

where δ1=360+(ΔP−ΔP$_{desired}$), where f$_{PWM}$ is an observed frequency of the carrier of the pulse width modulation of the first inverter, the second inverter, or each parallel-coupled inverter, where ΔP is the observed phase difference and ΔP$_{desired}$ is the target phase difference.

15. The method according to claim 13 wherein separately or cumulatively, for a further sampling interval, if the target phase difference is less than or equal to the observed phase difference, the frequency adjustment increases by a second adjustment ratio multiplier the pulse-width-modulation frequency of the first inverter and the second inverter, or each parallel-coupled inverter.

16. The method according to claim 14 wherein separately or cumulatively, for a further sampling interval, if the target phase difference is greater than the observed phase difference, the frequency adjustment decreases by a primary adjustment ratio multiplier the pulse-width-modulation frequency of the first inverter and the second inverter, or each parallel-coupled inverter.

17. The method according to claim 14 wherein separately or cumulatively, for a further sampling interval, if the target phase difference is less than or equal to the observed phase difference, the frequency adjustment decreases by a secondary adjustment ratio multiplier the pulse-width-modulation frequency of the first inverter and the second inverter, or each parallel-coupled inverter.

18. The method according to claim 14 wherein the frequency adjustments are stored in a look-up table, chart, an inverted file or data structure as frequency adjustment ratio multipliers and corresponding phase differences between the target phase difference and the observed phase difference.

19. A system for operating a set of inverters in parallel with an output coupled to a grid voltage source, system comprising: a first inverter having a set of first output phases coupled to the grid voltage source; a second inverter having a set of second output phases coupled to the grid voltage source in parallel to the respective first output phases; a phase measurement device for measuring at least one reference phase of the grid voltage source at a reference phase point; a data processor configured to determine an observed phase difference between the reference phase point and an observed position sample of one of a pulse-width-modulation carrier signal of the first inverter, the second inverter or each parallel-coupled inverter; the data processor configured to determine a target phase difference between the reference phase point and target position sample of one of the pulse-width-modulation carrier signal; and the data processor configured to determine a frequency adjustment to the pulse-width-modulation carrier signal of the first inverter, the second inverter, or all parallel coupled inverters based on a difference between the observed phase difference and the target phase difference, wherein if the target phase difference is less than or equal to the observed phase difference, the frequency adjustment comprises a second frequency adjustment multiplier ratio ($f_{PWM\_Adjust2}$) that increases the pulse-width-modulation frequency of the first inverter and the second inverter, or all parallel coupled inverters, in accordance with the following equation:

$$f_{PWM\_Adjust2} = \frac{f_{PWM}}{1 - \frac{\delta_2}{360}},$$

where $\delta2 = \Delta P - \Delta P_{desired}$, where $f_{PWM}$ is the observed frequency of the carrier of the pulse width modulation of the first inverter, the second inverter, or each parallel-coupled inverter, where $\Delta P$ is the observed phase difference and $\Delta P_{desired}$ is the target phase difference.

20. The system according to claim 19 wherein if the target phase difference is less than or equal to the observed phase difference, the frequency adjustment comprises a second frequency adjustment multiplier ratio ($f_{PWM\_Adjust2'}$) that decreases the pulse-width-modulation frequency of the first inverter and the second inverter, or all parallel-coupled inverters, in accordance with the following equation:

$$f_{PWM\_Adjust2} = \frac{f_{PWM}}{1 - \frac{\delta_2}{360}},$$

where $\delta2 = \Delta P - \Delta P_{desired}$, where $f_{PWM}$ is the observed frequency of the carrier of the pulse width modulation of the first inverter, the second inverter, or each parallel-coupled inverter, where $\Delta P$ is the observed phase difference and $\Delta P_{desired}$ is the target phase difference.

* * * * *